United States Patent [19]

Dey et al.

[11] 4,366,212
[45] Dec. 28, 1982

[54] NON-AQUEOUS CELL WITH FLUID CATHODE DEPOLARIZER AND CORRODIBLE CATHODE

[75] Inventors: Arabinda N. Dey, Needham, Mass.; William L. Bowden, Nashua, N.H.; Per Bro, Santa Fe, N. Mex.

[73] Assignee: Duracell International Inc., Bethel, Conn.

[21] Appl. No.: 232,778

[22] Filed: Feb. 9, 1981

[51] Int. Cl.$^3$ .............................................. H01M 4/36
[52] U.S. Cl. .................................. 429/101; 429/94; 429/196
[58] Field of Search ...................... 429/196, 101, 94

[56] References Cited

U.S. PATENT DOCUMENTS

| | | | |
|---|---|---|---|
| 3,644,145 | 2/1972 | Fraioli et al. | 429/196 X |
| 3,926,669 | 12/1975 | Auborn | 429/196 |
| 4,167,608 | 9/1979 | Giattino | 429/101 X |
| 4,219,443 | 8/1980 | Klinedinst et al. | 429/196 X |
| 4,264,687 | 4/1981 | Dey et al. | 429/196 X |

Primary Examiner—Charles F. Lefevour
Attorney, Agent, or Firm—Ronald S. Cornell; Israel Nissenbaum

[57] ABSTRACT

A non-aqueous cell containing a corrosive fluid cathode depolarizer such as thionyl chloride ($SOCl_2$) and a metal cathode such as of cold rolled steel which is substantially corroded by said fluid depolarizer with the cell having improved high rate discharge characteristics.

11 Claims, No Drawings

NON-AQUEOUS CELL WITH FLUID CATHODE DEPOLARIZER AND CORRODIBLE CATHODE

This invention relates to non-aqueous electrochemical cells containing corrosive fluid cathode depolarizers and more particularly to cells having thionyl chloride ($SOCl_2$) cathode depolarizers.

It has generally been believed that for electrochemical cells to operate properly the components utilized therein should be chemically compatible with one another in their physical juxtaposition. Thus in fluid cathode depolarized cells, for example, the cathode is comprised of an inert material relative to the fluid cathode depolarizer with examples of such materials including carbon and inert metals including nickel, gold, platinum, stainless steel, etc., as described in U.S. Pat. No. 3,926,669. Such inert cathodes operate as reaction sites for the cell reactions during discharge and at high rate discharge tend to become detrimentally clogged with non-conductive cell reaction products. Thereafter, the cells are unable to maintain the high rate discharge because of the increased internal resistance with cell capacity being reduced thereby. For example, in a cell having a lithium anode, a thionyl chloride cathode depolarizer and an inert carbonaceous cathode, during high rate discharge (e.g. above 3 amperes) the surface of the cathode becomes clogged with the insoluble non-conductive reaction product, LiCl. The interior of the cathode becomes less available for further operation as a reaction site with resultant loss of high rate discharge capability and cell capacity.

It is an object of the present invention to provide a means whereby the high rate discharge capability and cell capacity of fluid depolarized cells may be enhanced, with other objects features and advantages being evident from the following discussion.

Generally, the present invention comprises the use of a corroding metal cathode within a non-aqueous electrochemical cell having an active metal (e.g. lithium) anode and a corrosive fluid cathode depolarizer (e.g. $SOCl_2$). It has been discovered that corrosion products of fluid cathode depolarizers and corrodible metal cathodes, in contrast to the cell reaction products, do not significantly hinder high rate cell discharge. Additionally the cathode corrosion alleviates the problems engendered by the cell reaction products. The corrosion rate of the metal cathode in the preferred embodiment should preferably be substantially equal to the desired cell discharge rate whereby the high rate discharge may be maintained without excess corrosion. Because of the cathode corrosion it is understood that cells made in accordance with the present invention are most suitable in the form of reserve or standby operation wherein, prior to use, the cathode and the fluid cathode depolarizer are maintained separately. Thereafter, when discharge is required, they are contacted with each other by suitable means to form the operable cell. Examples of such reserve type structures include those described in U.S. Pat. Nos. 3,785,872, 3,929,507 and 3,930,895.

Fluid cathode depolarizers which are particularly corrosive include the oxyhalides such as phosphorus oxyhalide, thionyl chloride and sulfuryl chloride. Such materials are particularly corrosive with materials containing metals such as iron, (e.g. cold rolled steel, though not stainless steel, which is corrosion resistant) and copper and accordingly such metals, in corrodible form, are preferred for use in the cathodes of the present invention.

It is also preferred that the cathode be comprised of one or more thin metal foils in order to increase surface area available for reaction sites in a manner comparable to the prior art carbon cathodes. Such thin foils may further be made porous such as by fine perforations (e.g. as by heavy acid etching) to additionally increase available surface area. However, because of the corroding nature of the metal the cathode made therewith should be able to maintain structural integrity during the lifetime of the cell.

Usefully the foils are generally about 1-2 mils in thickness and are combined in up to about ten layers. Because of the structural strength of metals the cathodes may be made significantly thinner than prior art carbon cathodes thereby further enhancing rate capability.

The anode metals used in the cells of the present invention are active metals including alkali and alkaline earth metals and aluminum with the most preferred metal generally utilized in non-aqueous cells being lithium.

The electrolyte salts dissolved in the fluid cathode depolarizer, (which generally also functions as an electrolyte solvent with or without co-solvents) are usually active (particularly anode) metal salts such as $LiAlCl_4$, which is most commonly utilized in cells having thionyl chloride fluid cathode depolarizers and lithium anodes.

In order to more fully illustrate the operation of the present invention the following examples are presented. It is understood that such examples are for illustrative purposes only with the present invention not being limited to details specified therein. Unless otherwise indicated all parts are parts by weight.

EXAMPLE 1

A prismatic cell is constructed with a lithium anode and reference electrode (each $3 \times 5 \times 0.03$ cm) and a cathode made of eight layers of $3 \times 5 \times 0.0025$ cm cold rolled steel foil (each heavily etched with aqua regia welded to a nickel tab and wrapped with 4 layers of glass fiber separator (each 0.0025 cm thick)). The cell is filled with an electrolyte solution of 1.8 M $LiAlCl_4$ in $SOCl_2$ and gives an OCV of 3.63 volts and provides the following characteristics at high drains:

| Current Density (mA/cm)$^2$ | E init | E final | Time |
| --- | --- | --- | --- |
| 10 | 3.3 | 3.13 | 0.25 min. |
| 20 | 3.0 | 2.54 | 0.25 min. |
| 40 | 2.6 | 1.7 | 0.20 min. |

The cell is able to sustain the high rates for an appreciable period of time when compared to prior art cells in which the cathodes are almost instantaneously (several seconds at most) passivated with voltages dropping to zero. The cell is thereafter discharged at 1.0 mA/cm$^2$ and provides a capacity of 12.2 mAhr/cm$^2$ to 3.0 volts.

EXAMPLE 2

A "D" size convolutely wound cell having a lithium anode, $26 \times 1.875 \times 0.012$ in ($66.04 \times 4.76 \times 0.03$ cm), and a cathode as in Example 1 having the dimensions of $40 \times 1.75 \times 0.008''$ ($102 \times 4.4 \times 0.02$ cm), filled with the electrolyte of Example 1 (~49 grams) is pulse discharged at 20 A for 0.029 seconds followed by 3.2 A for 0.021 seconds with the cycle continuing for 20 seconds every three minutes. The cell provides about 11 Ahrs capacity.

EXAMPLE 3 (PRIOR ART)

A "D" size cell as in Example 2 but with a cathode comprised of 90% Shawinigan carbon black and 10% PTFE binder on an expanded nickel grid of dimensions 25×1.75×0.013" (63.5×4.4×0.033 cm) is pulse discharged as in Example 2 and provides about 8 Ahrs capacity. The cathode of Example 2 is thinner than the carbon cathode of Example 3 because it is comprised solely of metal and is therefore made longer to fill the volume of the "D" size cell.

It is presumed that the cathodes of Examples 1 and 2 which are badly corroded by the $SOCl_2$ form the corrosion product of iron chloride which is solubilized during the cell reaction whereby the effects of cathode passivation by the cell reaction product of the prior art as illustrated in Example 3 are substantially minimized.

The above examples are for illustrative purposes only with changes in cell configuration and components being possible in accordance with the present invention as claimed.

What is claimed is:

1. A non-aqueous electrochemical cell comprising an anode comprised of a metal selected from alkali metals, alkaline earth metals and aluminum, a fluid cathode depolarizer and a cathode consisting essentially of a porous metal selected from iron, steel and copper with said metal being subject to substantial corrosion by said fluid cathode depolarizer.

2. The cell of claim 1 wherein said fluid cathode depolarizer comprises an oxyhalide selected from the group consisting of thionyl chloride, phosphorous oxychloride and sulfuryl chloride.

3. The cell of claim 2 wherein said fluid cathode depolarizer is comprised of thionyl chloride.

4. The cell of claim 2 or 3 wherein said metal cathode is comprised of iron.

5. The cell of claim 2 or 3 wherein said metal cathode is comprised of copper.

6. The cell of claim 3 wherein said active metal anode is lithium.

7. The cell of claim 1 wherein prior to discharge thereof said metal cathode and said fluid cathode depolarizer are maintained separately.

8. The cell of claim 1 wherein said metal porous cathode is comprised of perforated metal foils.

9. A non-aqueous electrochemical cell comprising a lithium anode, a thionyl chloride cathode depolarizer and a cathode comprised of perforated foils of corrodible steel.

10. The cell of claim 9 wherein said steel is cold rolled steel.

11. The cell of claim 9 wherein said lithium and said cathode are convolutely wound.

* * * * *